(12) United States Patent
Wenzhi et al.

(10) Patent No.: US 11,484,018 B2
(45) Date of Patent: Nov. 1, 2022

(54) ELECTRONIC FISHING SYSTEM

(71) Applicant: Pure Hope Investments Limited, Tortola (VG)

(72) Inventors: Ji Wenzhi, Shandong (CN); Jia Peigeng, Shandong (CN)

(*) Notice: Subject to any disclaimer, the term of this patent is extended or adjusted under 35 U.S.C. 154(b) by 274 days.

(21) Appl. No.: 16/922,681

(22) Filed: Jul. 7, 2020

(65) Prior Publication Data
US 2022/0007626 A1   Jan. 13, 2022

(51) Int. Cl.
*A01K 89/01* (2006.01)
*A01K 89/017* (2006.01)
*A01K 89/015* (2006.01)
*A01K 87/08* (2006.01)
*A01K 89/033* (2006.01)

(52) U.S. Cl.
CPC .......... *A01K 89/017* (2013.01); *A01K 87/08* (2013.01); *A01K 89/0183* (2015.05); *A01K 89/046* (2015.05); *A01K 89/052* (2015.05)

(58) Field of Classification Search
CPC ............. A01K 89/012; A01K 89/017; A01K 89/0183; A01K 87/08
See application file for complete search history.

(56) References Cited

U.S. PATENT DOCUMENTS

| | | | | |
|---|---|---|---|---|
| 4,739,944 A * | 4/1988 | Atwell | ............... | A01K 89/012 242/244 |
| 5,004,181 A * | 4/1991 | Fowles | ............... | A01K 89/012 43/26.1 |
| 5,088,657 A * | 2/1992 | Chen | ............... | A01K 89/006 242/225 |
| 6,056,219 A * | 5/2000 | Barkley | ............... | A01K 89/006 74/625 |
| 6,880,775 B1 * | 4/2005 | Wenzel | ............... | A01K 89/01121 242/225 |
| 7,073,740 B2 * | 7/2006 | Westhoff | ............... | A01K 89/017 242/225 |
| 7,269,922 B1 * | 9/2007 | Mack | ............... | A01K 89/017 242/227 |
| 8,770,504 B1 * | 7/2014 | Sandstrom | ............... | A01K 89/017 242/225 |
| 9,060,500 B2 * | 6/2015 | Lauzon | ............... | A01K 89/012 |
| 2005/0162976 A1 * | 7/2005 | Kuriyama | ............... | A01K 89/00 367/111 |
| 2008/0289242 A1 * | 11/2008 | Cecil | ............... | A01K 97/125 43/18.1 R |
| 2014/0090287 A1 * | 4/2014 | Olson | ............... | A01K 97/12 43/17 |

(Continued)

FOREIGN PATENT DOCUMENTS

| | | | | |
|---|---|---|---|---|
| CN | 209171232 U | * | 7/2019 | |
| CN | 211793869 U | * | 10/2020 | |
| EP | 1402774 A1 | * | 3/2004 | ............ A01K 91/20 |

(Continued)

*Primary Examiner* — Emmanuel M Marcelo (57) ABSTRACT

The invention provides an electric fishing gear comprising a fishing reel, a handle, a motor and a motor speed control, the fishing reel can be removed to connect the handle, the fishing reel provides the lead power of the line by the motor, the motor speed control is used to adjust the speed of the motor in real time, to adjust the receiving speed of the fishing reel, the handle is set to provide electric power for the motor power device.

18 Claims, 8 Drawing Sheets

(56) References Cited

U.S. PATENT DOCUMENTS

2016/0100044 A1* 4/2016 Miyamae .............. H04W 76/14
                                                          455/420
2021/0352883 A1* 11/2021 Zhu ........................ G06F 3/015

FOREIGN PATENT DOCUMENTS

JP          2005192528 A  *  7/2005
JP          2012231692 A  * 11/2012

* cited by examiner

ELECTRONIC FISHING SYSTEM

FIELD OF THE INVENTION

The present invention relates to an integrated electronic fishing system that is easy to use, even with limited manual dexterity, and uses the benefits of technology to enhance the effectiveness of an angler using the system.

BACKGROUND OF THE INVENTION

Conventional fishing systems include a fishing rod and a fishing reel. Each part is purchased separately according to the angler's preferences, assembled, and filled with line for use. Such a system is very modular and affords an infinite number of combinations of rod and reel and can be very effective in the hands of a skilled angler.

The conventional, modular, rod and reel systems are based on hardware that lacks access to stored information and the ability to gain new information that might aid the angler. Thus, a new generation of fishing reels were made that included microprocessors, memory, and displays. See, e.g., U.S. Pat. No. 7,188,793. Some reels included motors for control over the winding and unwinding of the line that allowed technique jigging as well as automatic rewinding of cast line (e.g., U.S. Pat. Nos. 4,634,072; 8,770,504; and 9,060,500 and US application publication numbers 2008/0289242; 2015/0223440; and 2017/0086438). Such smart reels generally remained a modular system designed to fit on and work with any fishing rod.

As more information exchange was demanded by the reel but with functional limitations on the potential display size that a reel could accommodate, some systems were developed with the ability to communicate with the angler's smartphone for input and output. See, e.g., published application US 2015/0335001. Such a system required some degree of manual dexterity by the user in that many reel systems (e.g., bait casting and spinning reels) already required the use of both hands. Adding a separate device for operation of the reel could become complicated.

It would be advantageous to provide a smart fishing system that would use the benefits afforded by microprocessor technology in a manner that was easy to use by all anglers, even those having reduced, compromised, or impaired manual dexterity.

It would also be desirable to provide a fishing system that included a repository of instructions in a stored memory that could be selected and activated to help control operation of the fishing system to perform one or more fishing techniques that involve jigging (selective wind/unwind reel operations), casting, and rewinding processes.

It would also be desirable to have a fishing system that provided distributed controls so that both hands could both control the rod portion of the system while also allowing operation of the reel portion with the other hand without switching hands or moving the hands from gripping positions on the handle portion.

It would further be desirable to supply a method for controlling the operation of a fishing reel in an integrated fishing system having a rod portion, a handle portion, and an integrated fishing by way of the electronic control panel that includes variable speed subroutine operating on the reel for controlled jigging of a lure attached to a fishing line whose length is controlled by the fishing reel and associated drive system.

SUMMARY OF THE INVENTION

It is an objective of the present invention to provide an integrated fishing system that is readily gripped, controlled, and operated by anglers of all ages having minimal manual dexterity.

It is further an objective of the invention to provide an integrated, smart, fishing system that allows convenient operation of the integrated control systems to select and activate stored subroutine instructions that mimic one or more styles of lure jigging attached to the end of a fishing line whose position is controlled by the reel portion of the system.

In accordance with the above and other objectives of the invention that will become apparent from the description here, a smart fishing system according to the invention comprises:

(a) a fishing rod having an extended length along an axis and integrated with an upper arm section of a handle, (b) a spinning or spincast fishing reel detachably secured to said lower arm section and to an underside of said upper arm section, and (c) a motor drive comprising a motor connected to the fishing reel and arranged inline or on one side of the fishing reel to provide a driving force for winding a fishing line on the fishing reel, and (d) a handle having a human-machine interaction touch screen panel on a top surface thereof and a power supply device, such as a battery, within the handle that supplies power to the motor and said touch screen panel, (e) a housing arranged around motor, the housing being provided with a speed adjusting button that is configured to adjust the rotation speed of the motor in response to one or more pre-programmed fishing technique routines that are selectable on the touch screen by an angler holding the handle, wherein, when a user uses the fishing system, one hand of the user grips the handle and controls the human-machine interaction panel to select the fishing mode, and the other hand of the user grips the housing to adjust the speed of the motor by the speed-adjusting slider button, so as to control winding of fishing line on the fishing reel at variable speeds based on a fishing mode selected by the user with the human-machine interaction touch screen panel.

Also provided herein is a method of controlling the operation of a fishing reel in the integrated fishing system described above by way of the touch screen panel that communicates with a microprocessor and stored microprocessor instructions that control operation of the reel motor to provide operational routines that mimic controlled jigging of a lure attached to a fishing line whose length is controlled by the fishing reel and associated drive system.

The smart fishing system of the invention and its method of operation provides an integrated system of rod, reel, and microprocessor-controlled reel hardware under the convenient control of properly a positioned interface panel for an angler to operate the smart fishing system without moving the user's hands from their normal positions when gripping the handle and motor speed control. This system leverages the power of stored fishing technique instructions and a programmed processor to access them to provide anglers of all ages and dexterity abilities with the opportunities of using advanced fishing techniques of experienced anglers.

DETAILED DESCRIPTION

The invention generally relates to an integrated smart fishing system that uses a motor-driven fishing reel integrated with a handle having a control interface, such as a touch screen panel located on the top of the handle in convenient view and access by the angler. Through the control interface, the angler can select, modify, and/or program the motor drive to act on the operation of the fishing reel in ways that mimic one or more fishing techniques. Typical techniques that would benefit from such controls are jigging techniques that can vary widely by type of fish, bait, lure, region, season, and water conditions. The ability to have such techniques available for recall and implementation by even an inexperienced, young, or dexterity-compromised angler provide for more enjoyable and productive fishing experiences.

In the present invention, the handle is integrated with the reel in a manner that provides all anglers with easy access to the interface panel. The battery or batteries used to power the interface and drive are all secured in internal chambers of the system. A modular design allows the rod, reel, and motor drive components to be removed and replaced for repair, upgrade, or implementing a fishing reel style change between spincasting and spinning.

The handle of the present invention is preferably made to present a non-slip exterior surface that optionally has sufficient buoyancy to float the assembled system in fresh or salt water should the system fall overboard. Suitable materials generally include closed cell, elastomeric foams or buoyant natural materials like cork.

Because the battery used to power the system is located inside the handle, the handle is preferably provided with a connection to allow the battery to be recharged and then sealed against water, dirt, and other environmental contaminants that might affect the electrical functions of the battery. A conventional USB or AC adapter port can be used with a suitable cover. An especially preferred charging system uses inductive charging that avoids the need for piercing the handle with ports and openings.

Figure 1:
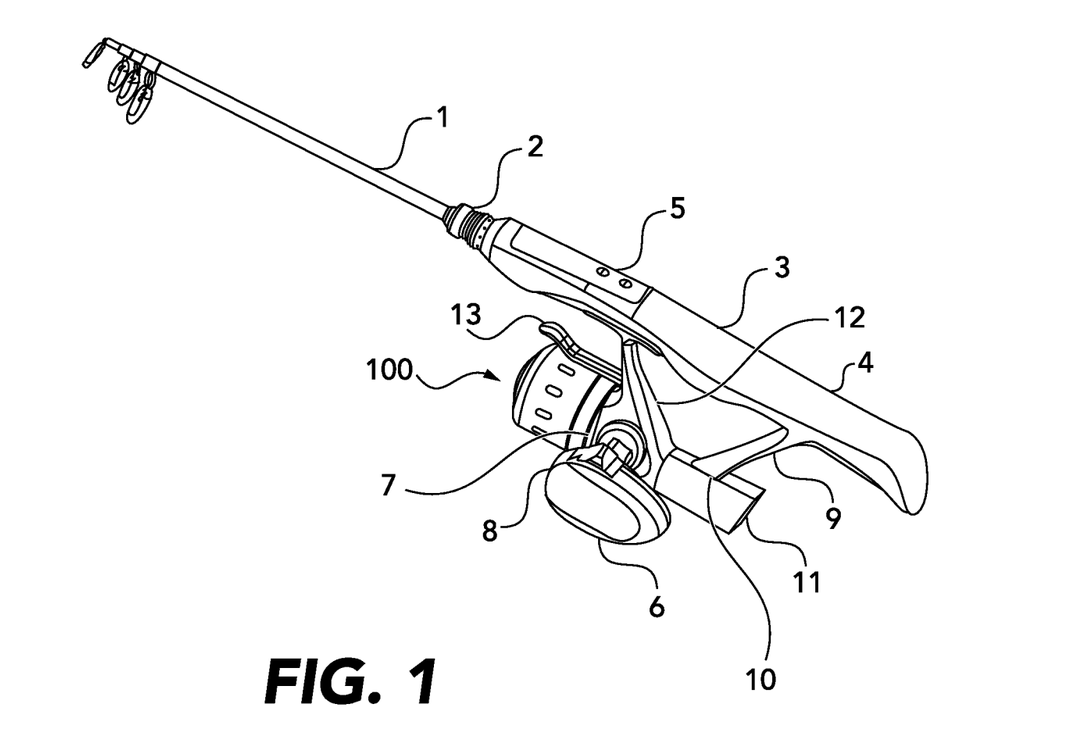
FIG. 1 schematically illustrates an isometric view of a fishing system according to a first embodiment of the invention.
Figure 3:
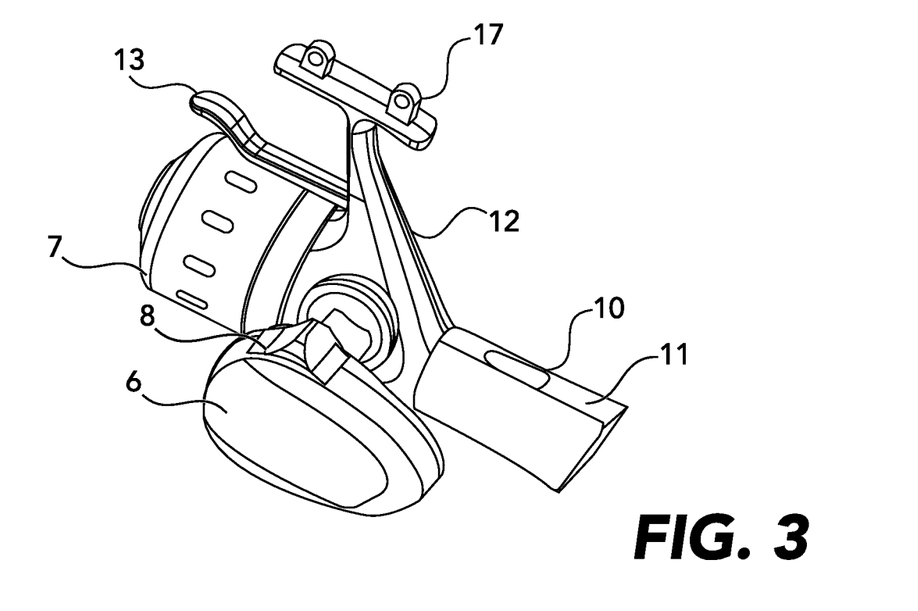
FIG. 3 is a schematic diagram of the overall structure of a fishing reel and a motor speed control provided by a first embodiment of the present invention.
Figure 4:
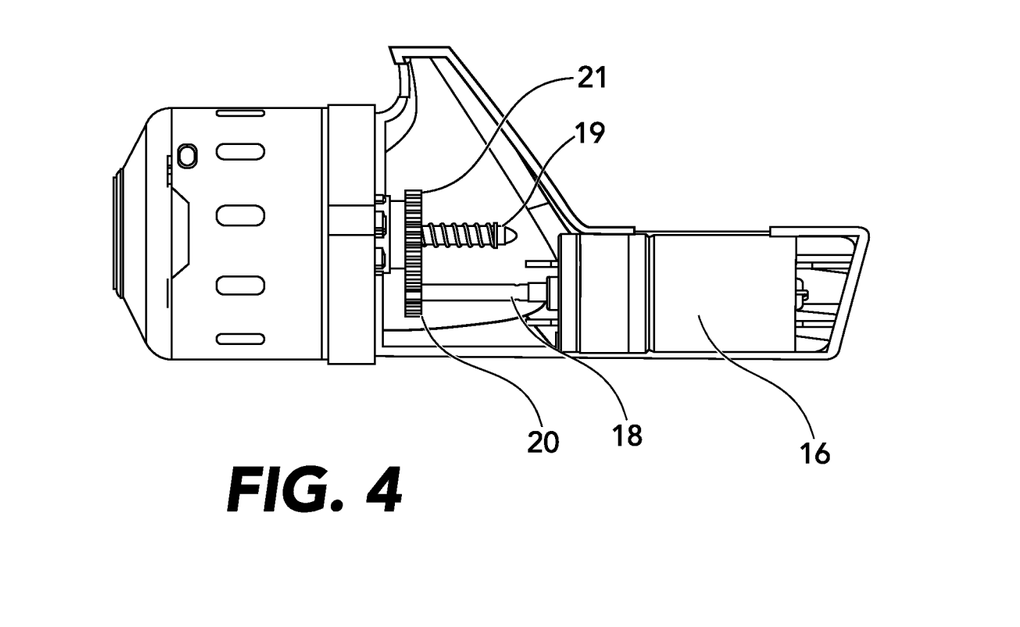
FIG. 4 is a schematic diagram of the internal structure of the fishing vessel area provided by a first embodiment of the present invention.

FIGS. 1, 3 and 4 relate to a first embodiment of the invention having an inline drive shaft in a motor chamber located axially behind the reel. The rear of the handle connects to the top of the motor chamber housing for convenient routing of wired connections.

Figure 5:
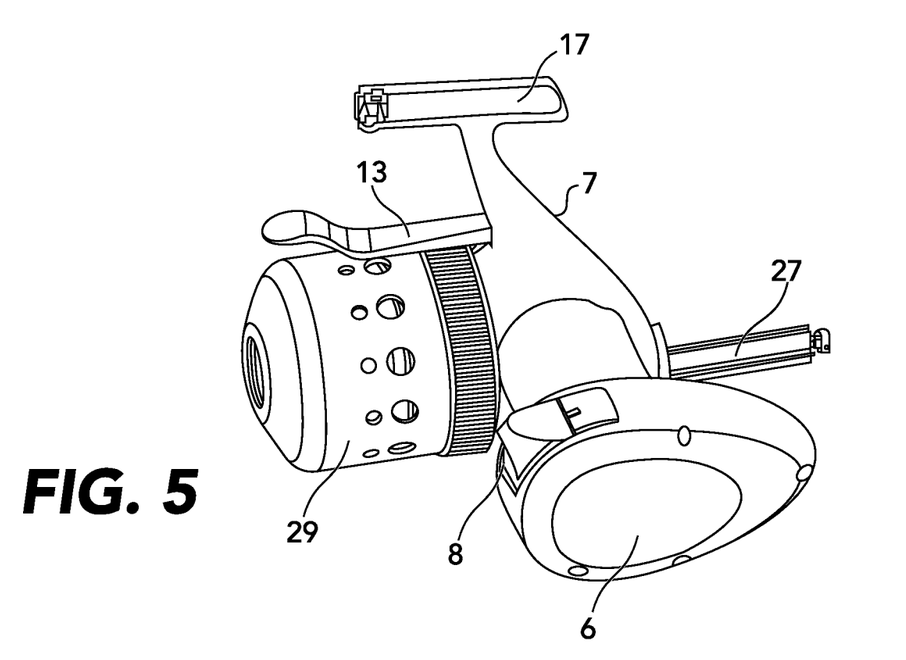
FIG. 5 is a schematic diagram of the overall structure of a fishing reel and a transverse motor and speed control provided by a second embodiment of the present invention.
Figure 6:
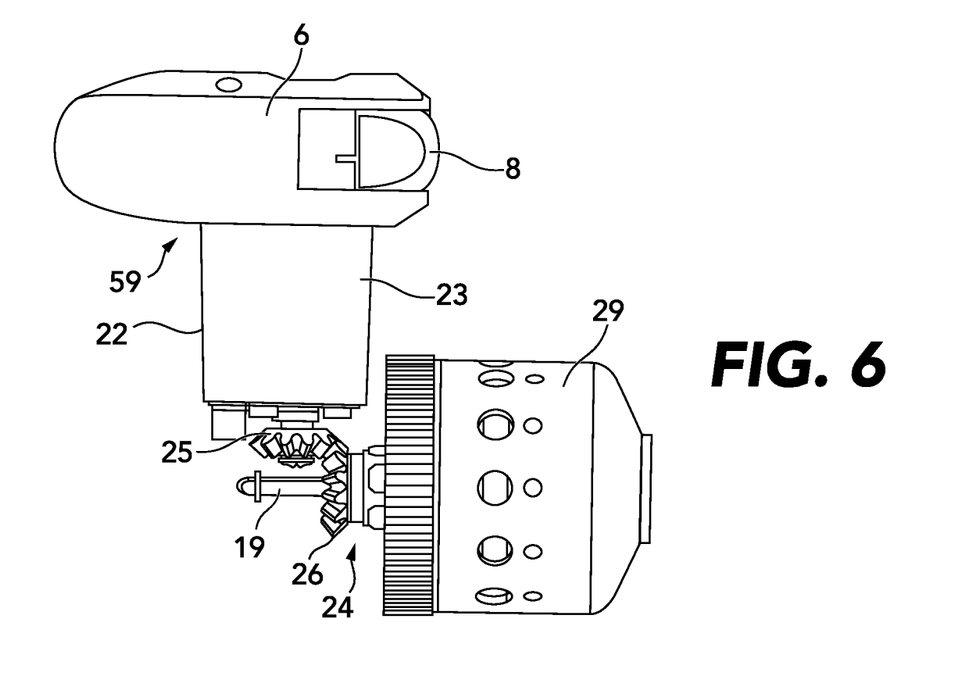
FIG. 6 is a schematic diagram of the connection structure of the system shown in FIG. 5.
Figure 7:
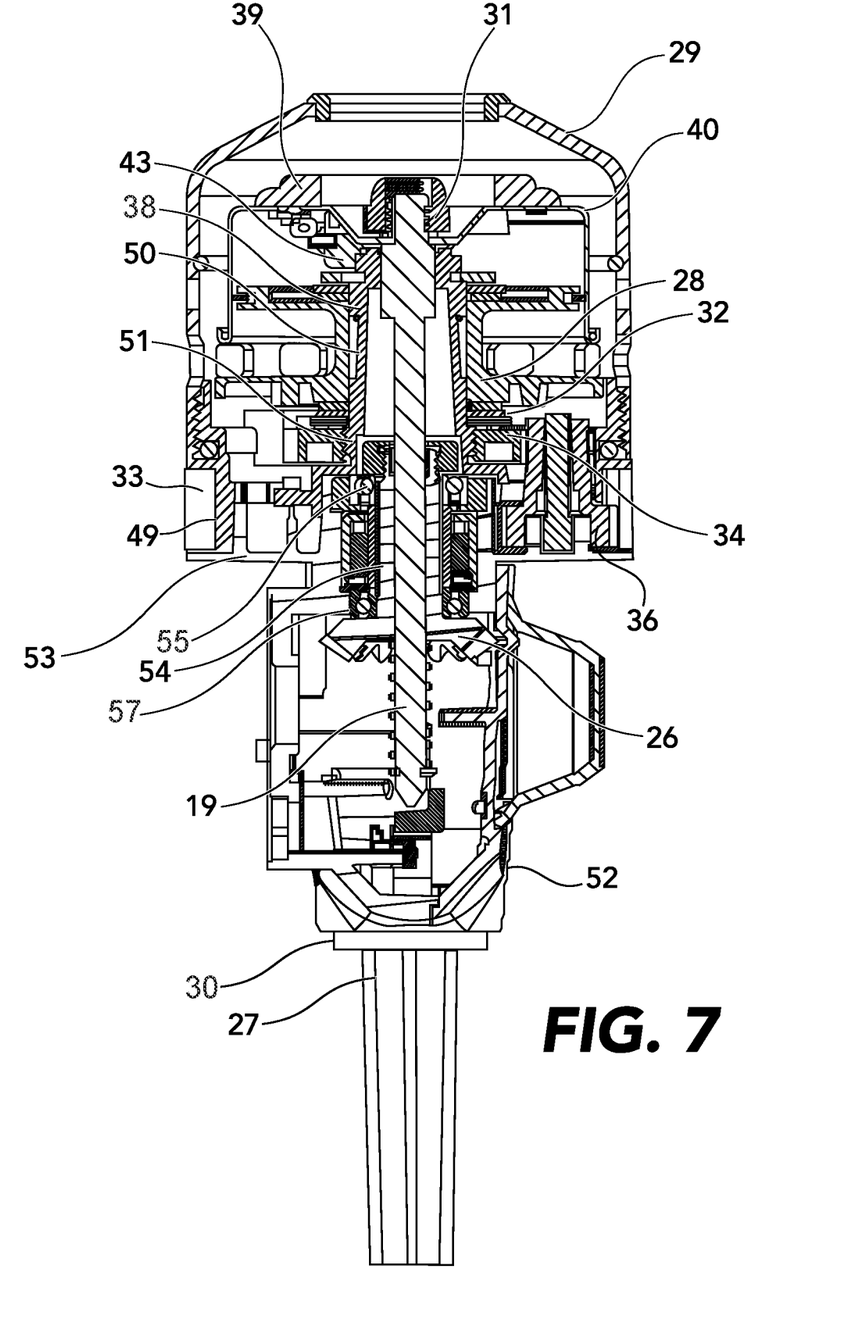
FIG. 7 is a cross-sectional bottom view of a fishing reel provided by the present invention.

FIGS. 5-7 describe a $2^{nd}$ embodiment of the invention in which the drive motor is substantially perpendicular to the axis of the rod and reel and interacts with the spool shaft by engaging pinion gears. This embodiment also illustrates a post connector that is secured into a mating receiver connector associated with a descending support arm from the rear or underside of the handle.

The remaining figures illustrate reel structures that are used in either embodiment of the invention.

As shown in FIG. 1, the invention involves a smart fishing system 100 having fishing rod 1 of an extended, axial length that is integrally connected at mounting seat 2 with handle 3. Handle 3 exhibits a grippable upper section 4 that is axially aligned with rod 1.

Touch screen 5 is disposed on the top surface of handle 3 for angler interaction with a programmed motor speed control 6 that allows the angler to use pre-programmed sequences of motor functions acting on fishing reel 7 to mimic selectable jigging and fishing modes. At this location, the display can be readily seen by the angler in normal use and is within convenient reach of the angler's thumb or pointer finger for selection of a displayed operational option. The display provides the angler with selectable options by touch for different styles of jigging the lure. The selection activates a microprocessor or similar computational device that then runs a series of programmed motor controls stored in a storage memory. These controls mimic the selected series of winding operations and nonoperational times in a sequence that mimics the desired jigging style.

A touch sensitive menu displayed on the screen 5 allows the angler to select a desired jigging style from among a plurality of options so that the associated microprocessor and motor controls can implement the selected fishing style. Speed-controlling slider button 8 provides the angler with additional override speed controls to increase or decrease the retrieving action of speed control 6 as well as reverse operation for fast or controlled sinking action.

Underneath handle 3 is support arm 9 that descends from the underside of handle 3 in a downward angle towards the front of handle 3 and into contact with the top rear connector 10 of motor chamber 11 of fishing reel 7 to provide a generally triangular shape between reel stem 12, handle 3, and support arm 9. Such a shape helps to ensure overall stability of the resulting system.

Speed control 6 with a variable speed slider button 8 is laterally positioned and substantially perpendicular to the axis of rod 1 and handle 3 to allow the angler to hold the assembly comfortably and in balance with handle 3 while also having convenient access to operation of the motor drive and to touch screen 5 on top of handle 3. Although not shown in FIG. 1, fishing reel 7 is also provided with a corresponding connection on the other side of reel 7 from that shown to receive speed control module 6 to accommodate both right-handed and left-handed anglers.

Preferably, the fishing reel 7 has a trigger 13 of a trigger-operated spinning reel or spincast reel. Such reels minimize the need to rearrange the angler's hands while retrieving or casting a lure attached to fishing line wound onto the spool reservoir of the reel. Such ease of use is particularly advantageous for new anglers and anglers of more limited manual dexterity.

Figure 2:
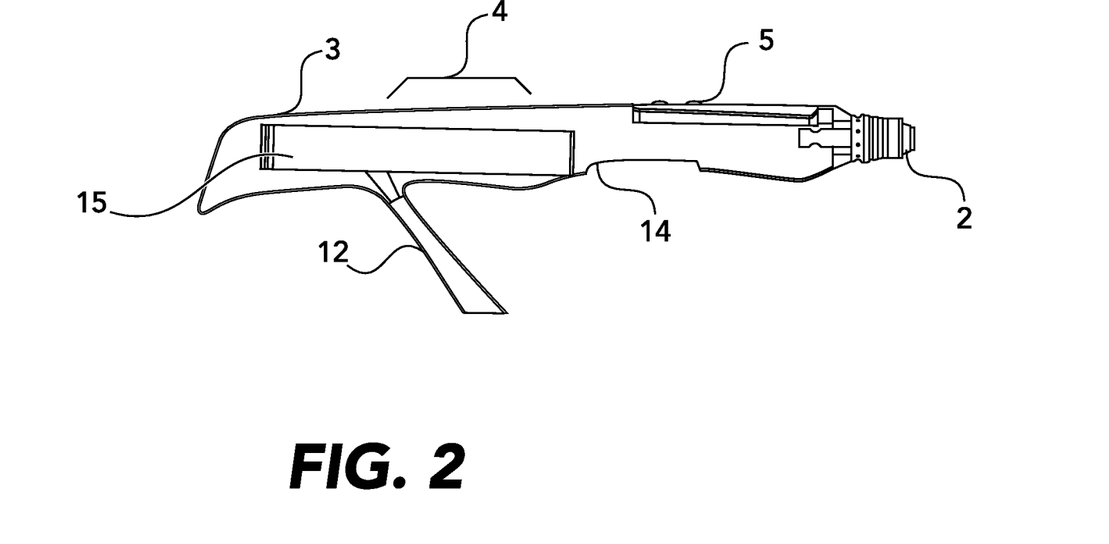
FIG. 2 is a schematic diagram of the internal structure of the handle provided by the present invention for all embodiments.

FIG. 2 shows additional details regarding handle 3. The underside of handle 3 includes receiving mount 14 forward of the underside of upper section 4 and substantially below touch screen 5. Receiving mount 14 is where reel stem 12 is secured to handle 3.

The interior of handle 3 preferably includes sealed, waterproof cavities that will provide buoyancy if the assembly is dropped overboard or off the deck. Within such a cavity is rechargeable battery 15 that is electrically connected to and provides power for all electronic components, e.g., touch screen 5, motor speed control 6, and motor drive 16.

FIG. 3 shows additional details of the outside of fishing reel 7, such as rear connector 10 and reel stem mounting foot 17. Wiring among touch screen 5, speed slider button 8, motor 10, and battery 15 can pass through an appropriate opening in rear connector 15.

FIG. 4 shows additional details of the inside of fishing reel 7, such as motor 16 in which axially oriented motor drive shaft 18 acts directly on spindle shaft 19 by the interaction of a $1^{st}$ spur gear on drive shaft 18 that engages a $2^{nd}$ spur gear 20 on spool shaft 19. As shown, motor drive shaft 18 and spool shaft 19 are displaced relative to the other but oriented in substantially parallel direction along the same general axis of extension that is substantially parallel to the axis of extension of rod 1.

The second embodiment is shown in FIG. 5. Transverse drive motor 22 in motor drive housing 23 is connected to one side of the fishing reel 7 and interacts with the spool drive system 24 via interacting drive pinion 25 and spool pinion 26.

Transverse motor drive 22 is electrically connected to battery 15 within handle 3 and provides the driving force for winding fishing line into the fishing reel 7. When disengaged, such as when casting, fishing line from the reel can be freely cast and allowed to unspool without substantial resistance.

Reel stem mounting foot 17 extends upwardly from reel 7 and is used to connect reel 7 to the underside of handle 3 at receiving mount 14. If desired, appropriate mating connections between mounting foot 17 and receiving mount 14 may form a snap connection to handle 3. A descending rear connection arm (not shown) from handle 3 could then also snap into place at rear connector 27 for structural support as well as forming electrical connections to battery 15.

Motor speed control 6 is integrated with the outer end of transverse drive motor 22 and includes speed slider button 8 to override the automated operation of drive motor 22.

FIG. 6 illustrates the internal connection between the drive pinion gear 25 and the spool pinion gear 26 that operates on the spindle shaft 19. This interaction controls both rewind of cast fishing line and, when the pinion gears are disengaged due to forward displacement of spindle shaft 19 by pulling upwardly on trigger 13 for casting fishing line (not shown) from the internal reservoir spool 28 (see FIG. 8). The reel 7 is covered by a reel cover 29 and is sealed from contamination at its rear with back plate 30 (FIG. 7).

FIG. 7 is a detailed, cross-sectional view of fishing reel 7 without the motor drive 16 connected. FIG. 7 also shows the overall layout and organization of the sub-assemblies shown in FIGS. 8-11.

Figure 8:
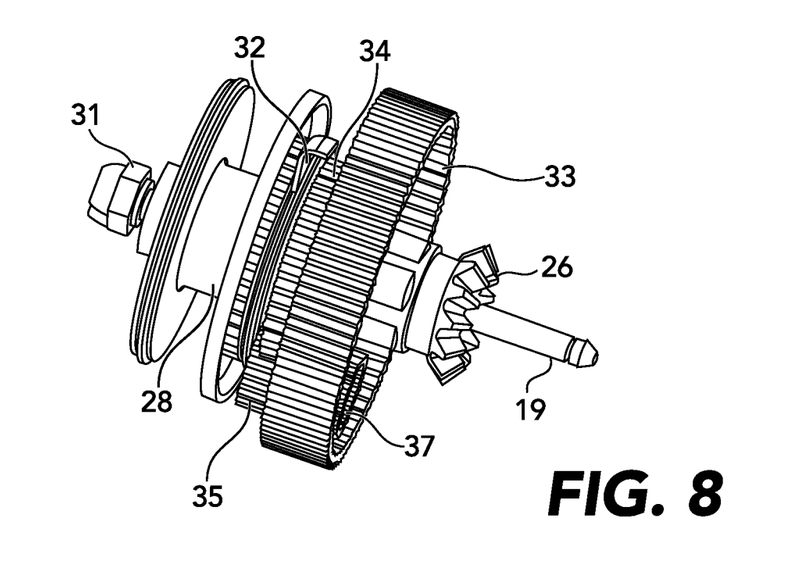
FIG. 8 is a schematic diagram of the spool and brake structure of the fishing wheel provided by the present invention.

FIG. 8 shows the spool sub-assembly. Spindle shaft 19 extends the length of the reel 7 and is secured underneath the reel cover 29 by a spindle nut 31. Spool 28 is secured below the spindle nut 31 and above a drag washer stack 32 that is compressed by interaction of the brake adjustment ring 33, the brake feed gear 34, and the second brake transmission gear 35.

The braking device shown in the figures comprises a brake feed gear 34, a brake double-linked gear 36, a brake adjustment ring 33 and a drag washer stack 32 that are centered on the spindle shaft 19 and sequentially outwardly arranged along its radial direction. The brake double-linked gear 36 has a first brake transmission gear 37 and a second brake transmission gear 35. External teeth on the first brake transmission gear 37 engage internal teeth of the brake adjustment ring 33. The external teeth of the second brake transmission gear 35 engage the external teeth of the brake feed gear 34. The brake feed gear 34 engages external thread of the spool fixing base 38 such that the brake feed gear 34 is axially movable relative to the spool fixing base 38 while the drag washer stack 32 is positioned forward of the brake feed gear 34 towards the spool 28.

When the brake adjustment ring 33 is rotated for adjustment, the brake adjustment ring 33 drives the brake feed gear 34 forward or backward through the brake double-linked gear 36 to adjust the braking force. When the brake feed gear 34 is driven forward to exert greater drag, the brake feed gear 34 presses the drag washer stack 32 against the spool 28 to restrict the rotation of the spool 28 and thereby increase the braking force. When the brake feed gear 34 is retracted, the compression of the drag washer stack 32 against the spool 28 is reduced or removed to reduce the braking force.

Figure 9:
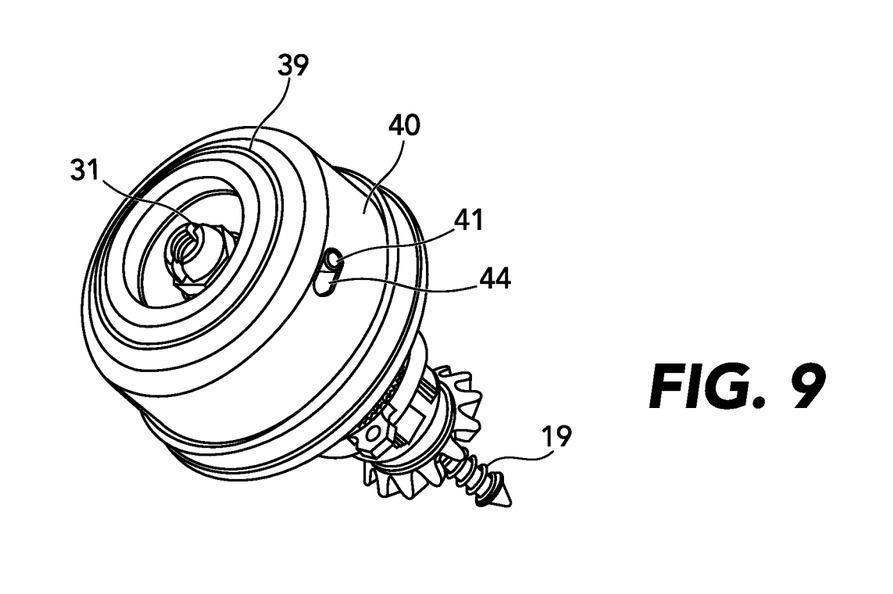
FIG. 9 is a schematic diagram of the covered internal spool structure of the fishing reel provided by the present invention.
Figure 10:
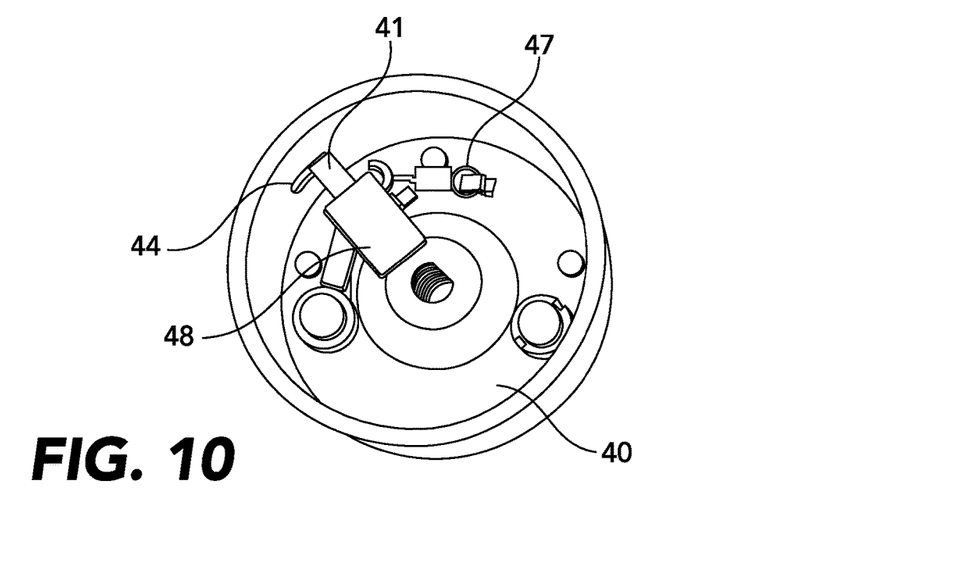
FIG. 10 is a schematic view of the underside of the spool shell of the fishing reel provided by the present invention.
Figure 11:
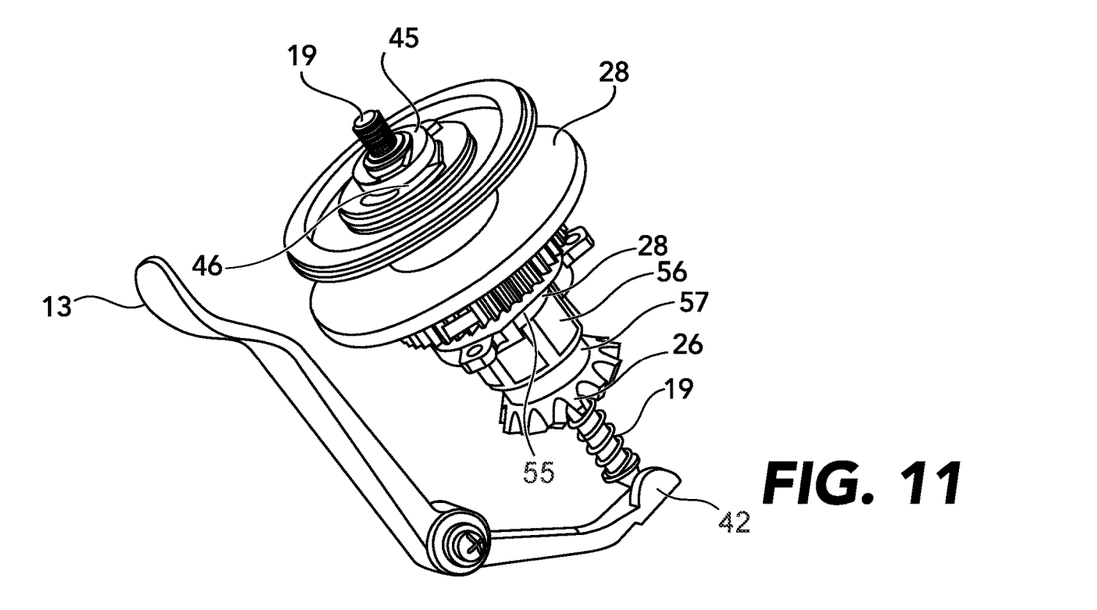
FIG. 11 is a schematic view of the connection structure of the reel structure, transmission structure, brake structure and casting trigger of the fishing reel provided by the present invention.

FIGS. 9-11 show additional details of the mechanisms that interact to allow casting and retrieval of fishing line on spool 28, such as the stationary spool of a spincast reel assembly, over the forward end 39 of the reel casing 40. FIG. 10 illustrates the underside of reel casing 40 and the operation of the rewind pin 41 that is also known as a pickup pin. This pin should extend during when rewinding line and retract when casting line. FIG. 11 generally shows the use of a lever arm 42 at the end of trigger 13 for one-finger control during casting whereby the rewind pin 41 is retracted and fishing line (not shown) is pinched by the perimeter of spool 28 between the forward end 39 of reel casing 40. When casting, lever arm 42 is released at the point of casting so the line is no longer pinched and is allowed to unspool freely from spool 28.

The spool assembly of the reel 7 includes a spool stop positioner 43, a rewind pin 41 that can extend from the casing opening 44 when rewinding line onto the spool 28, a limit ring 45, and an E-shaped retaining ring 46. The spool stop positioner 43 has a spring 47 and a positioning member 48 that are detachably connected with each other. The rewind pin 41 is fixedly arranged on the positioning member 48 which is rotatably connected to the underside of the casing 40. The limit ring 45 and the E-shaped retaining ring 46 are sleeved on one end of the spindle shaft 19 near the casing 40.

The limit ring 45 on the top of the spindle shaft 19 cooperates with the E-shaped retaining ring 46 to cause the telescopic movement of the rewind pin 41 through the casing opening 44 in the casing 40. For example, when the spindle shaft 19 is located at its original position, the limit ring 45 presses on the positioning member 48 to drive the rewind pin 41 to extend outwardly against the biasing force of the spring 47. Fishing line is then caught by the extended pin and rewound onto the spool 28 as the spindle shaft 19 turns.

When the lever arm 42 pushes the spindle shaft 19 to move axially forward and out of pinion gear engagement, the limit ring 45 releases the restriction on the positioning member 48 so that the biasing effects of the spring 47 acts on the positioning member 48 and retracts the rewind pin 41 into the casing 40.

Reel casing 40 is internally threaded to screw onto external threads of fixing frame 49. Spool fixing base 50 is around spindle shaft 19 and provides support for spool 28 within reel 7.

As shown in FIG. 7, reel 7 has a main body 52 that includes an internal support platform 53 for carrying and supporting the reel components. The perimeter of the platform 53 includes threads for attaching internal reel casing 40 and an external reel cover 29. The platform 53 includes a hollow central cavity. A fixing frame 49 is vertically placed on the platform 53. The fixing frame 49 is hollow and cylindrical. The fixing frame 49 is close to the brake adjustment ring 33 and is sleeved on the end closer to the platform 53. The brake adjustment ring 33 rotates on the fixing frame 49. Toothed transmission gear sleeve 54 translates the rotation of spool pinion gear 26 into rotation of spool 28.

As shown in more detail in FIGS. 7 and 11, the transmission structure in reel 7 includes a spindle shaft 19, a toothed transmission sleeve 54, a first bearing 55, an anti-reverse mechanism 56, a second bearing 57, and trigger 13 interacting with lever arm 14 at the end of spindle shaft 19. The spindle shaft 19 is rotatable relative to the main body 52. The transmission gear sleeve 54 circumferentially surrounds spindle shaft 19 and is fixedly arranged at the middle of spindle shaft 19. The end of the transmission gear sleeve 54 near the spool fixing base 50 of the spool 28 is screwed to a rack nut, and the end away from the spool fixing base 50 of the spool 28 is provided with a spool pinion gear 26. The first bearing 55 is along the transmission gear sleeve 54 is circumferentially surrounded and disposed near the gear bar nut, the anti-reverse system 56 is threaded on spindle shaft 19 and is disposed between the spool pinion 26 and the first bearing 55. Anti-reverse gear 56 is used to allow spindle shaft 19 to rotate only in a winding direction.

If the fishing line is pulled by an external force, the fishing line cannot be released under the effects of anti-reverse 56 and spindle shaft 19 cannot rotate backwards to protect the motor speed control 6. The second bearing 57 is disposed on spindle shaft 19 between the spool pinion 26 and the anti-reverse gear 56. A double bearing is provided to reduce friction and improve transmission efficiency.

One end of the lever arm 42 is provided outside the main casing, and the other end is provided at the accommodating space in cooperation with the end of the spindle shaft 19 opposite away from the spindle nut 31. The user operates lever arm 42 using trigger 13 to axially displace spindle shaft 19 towards the front of the reel so that the end of spindle shaft 19 cooperates with the spool stop positioning member 43 to retract rewind pin 41 and allow line to unspool freely during a cast.

Figures 12, 13, 14:
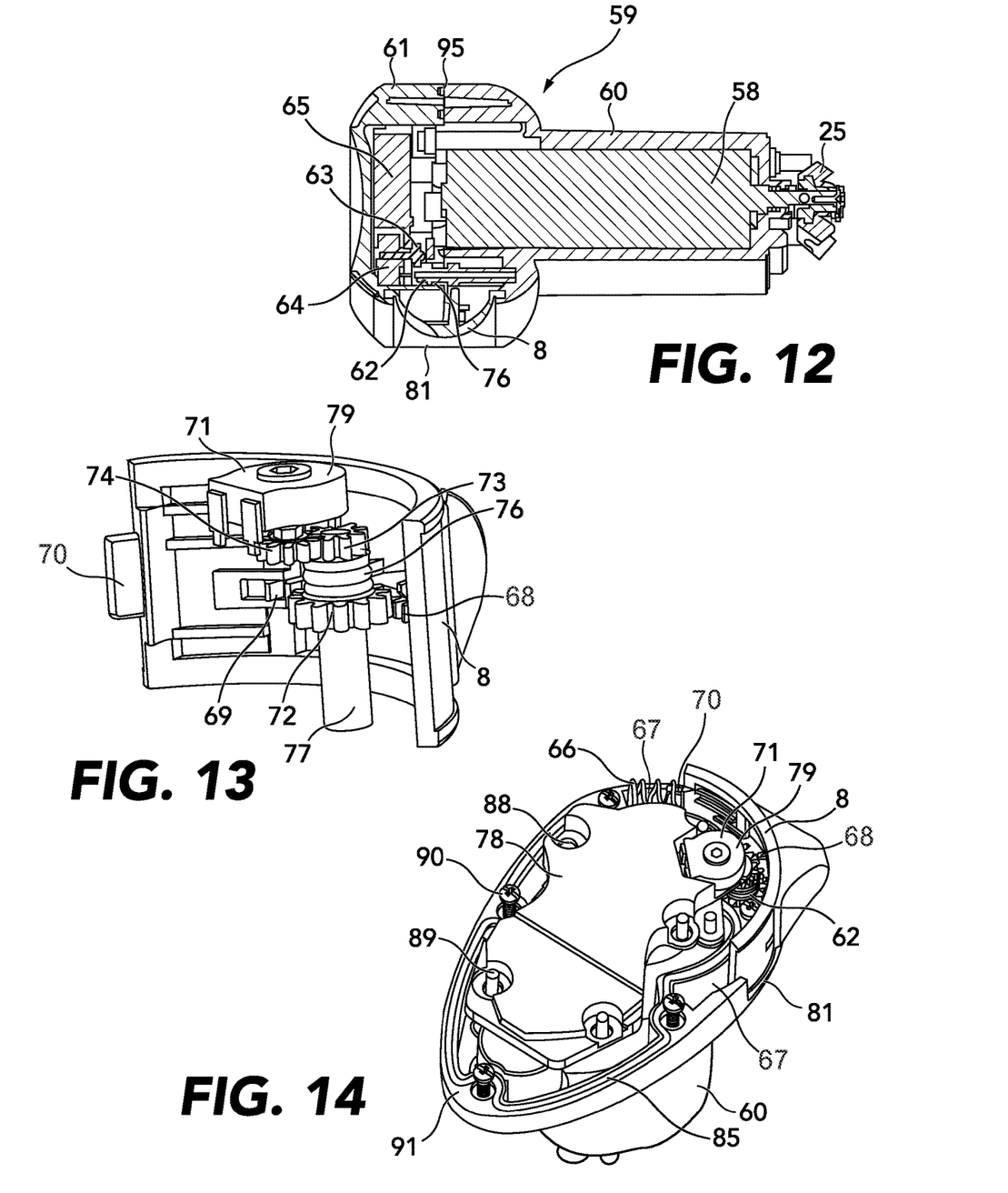
FIG. 12 is a schematic cross-sectional view of the motor speed control provided by the present invention.
FIG. 13 is a view of the linkages for the speed control mechanism of the present invention.
FIG. 14 is a schematic plan view of the motor and speed control systems of the present invention.

FIGS. 12-16 illustrate details of the transverse motor drive. As shown in FIG. 12, a housing is arranged around the reel motor 58 and is provided with a slidable speed-adjusting button 8 with internal linkages (see FIG. 14) that adjust the rotation speed of reel motor 58 for rewinding of line back onto spool 28.

Transverse motor drive 59 includes a motor drive pinion gear 25 connected to motor 58 in lower housing 60 that is sealed with upper housing 61 by a first sealing ring 95. Speed-adjusting slider button 8 acts on a speed-adjusting double-linked gear 62 to actuate potentiometer gear 63 and resistor 64. Circuit board 65 includes appropriate circuits that control power to the motor 58 as the speed-adjusting slider button 8 is further depressed against the biasing effects of speed spring 66.

FIGS. 13 and 14 show that motor drive 59 includes a sliding speed control slider button 8 and a speed-adjusting double gear 62. Slider button 8 is placed in slider groove 67. Mounted on the underside of slider button 8 is speed-adjusting tooth 68. Motor drive 59 further includes speed spring 66 that exerts a biasing force on the movement of slider button 8 in slider groove 67. One end of speed spring 66 is fixedly locked in the slider groove 67, and the other end is retained on retention lip 70 of slider button 8.

A series of gear interactions under slider button 8 generates an electrical current through potentiometer 71 that is used to affect the speed of motor 58. As shown in FIG. 13, speed-adjusting tooth 69 interacts with speed-regulating double gear 62, 1st speed-adjusting gear 72, 2nd speed-adjusting gear 73, and potentiometer gear 74 to produce a current through potentiometer 71 that is sent to motor 58 through electrical contacts 75. Spacing washers 76 separate 1st speed-adjusting gear 72 from 2nd speed-adjusting gear 73. Slider button shaft 77 is a support for the 1st speed-adjusting gear 72, spacing washers 76, and 2nd speed-adjusting gear 73. Spacing washers 76 also serve as sealing elements that keep water and environmental contaminants out of motor drive 58.

Speed spring 66 biases speed-adjusting slider button 8 to a resting position in which the motor drive 58 is not activated. The first speed-adjusting gear 72 and the second speed-adjusting gear 73 are rotationally mounted on button shaft 77 and spaced apart by spacing washers 76. Gear teeth on the underside of the speed-adjusting slider button 8 cause the first speed-adjusting gear 72 and the second speed-adjusting gear 73 to rotate thereby turning the potentiometer gear 74 causing potentiometer 71 to rotate to adjust the resistance of the resistor 79 and thereby adjust the speed of motor 58. Shaft 77 fits into opening 94 of lower case 60.

Circuit board 78 fits in lower housing 60 of motor drive 59 over the centrally-located motor section 80. Circuit board 78 is electrically connected to the motor 58 and configured to control the operation of motor 58 with potentiometer 71.

Upper housing 61 where it connects to the upper portion of lower housing 60 is preferably egg-shaped for convenient and ergonomic gripping by the angler. A forward side of upper housing 61 and lower housing 60 each have an opening in the shape of an arc. Slider button 8 fits in the opening formed by upper slider slot 81 and lower slider slot 33C.

Upper housing 61 is also provided with a charging socket 83 that is electrically connected to battery 15 for recharging battery 15.

Figure 15:
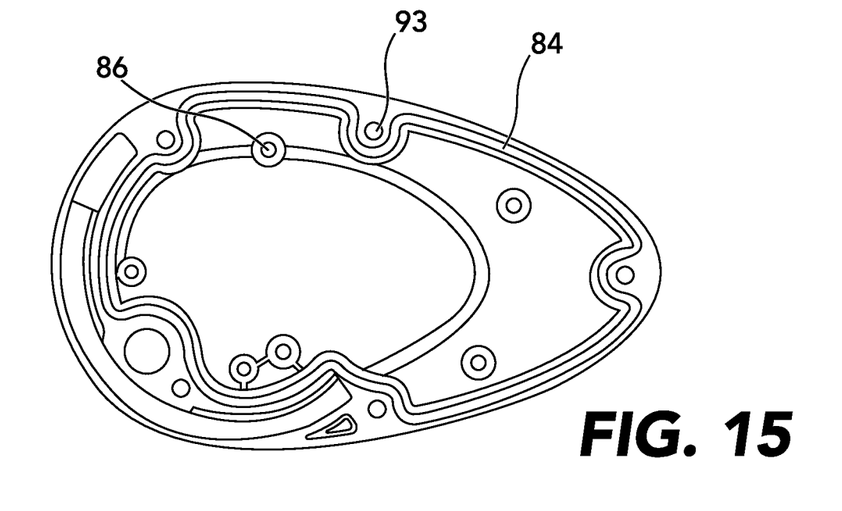
FIG. 15 is a view of the inside of the speed control cover.
Figure 16:
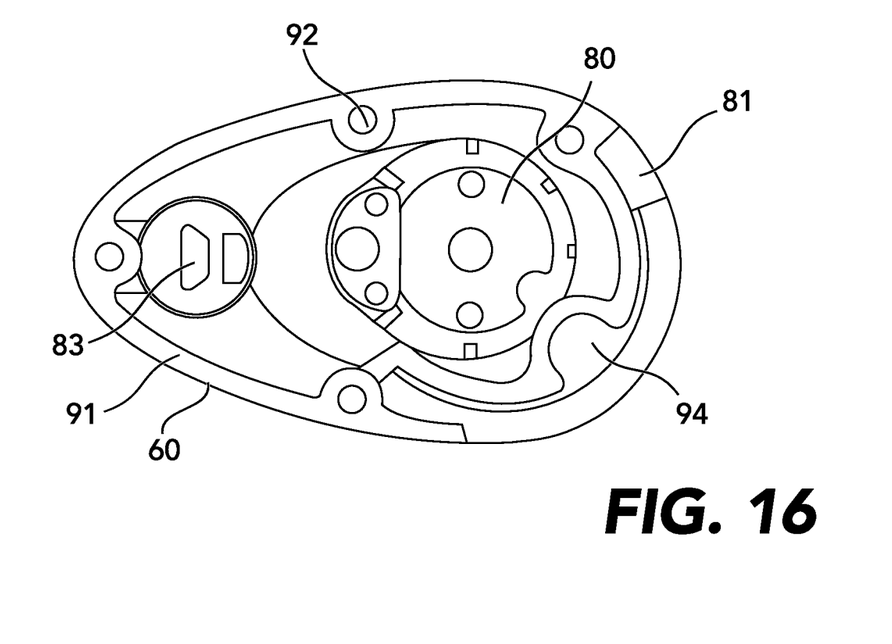
FIG. 16 is a view of the inside of the housing that holds the motor drive.

FIGS. 14-16 show the connections and sealing features between the upper housing 61 and the lower housing 60. Lower housing 60 has a motor receiving compartment 80, and the motor 58 is placed in the receiving compartment 80. Sealing groove 84 on the lower housing 60 receives the first sealing ring 85 to provide a water resistant seal between the upper housing 61 and the lower housing 60. Upper housing registration holes 86 and upper housing screw holes 87 on upper housing 61 align with lower housing pin holes 88 and registration pins 89. A plurality of first connecting members 90, such as stainless steel screws, extend through screw holes 93 to secure upper housing 61 to mounting platform 91 of lower housing 60 into threaded holes 92 on mounting platform 91.

The shape of the handle and rod wherein when the user uses the electric fishing gear, one hand of the user grips handle 3 and controls the touch screen 5 to select the fishing mode. The other hand of the user grips the transverse motor drive 59 housing to adjust the speed of the motor 58 by the speed-adjusting slider button 8 to wind the fishing line on spool 28 of fishing reel 7 at variable speeds based on different fishing modes. Speed control slider button 8 can manually increase the rate of rewind the further the slider button 8 is pushed. The programmed modes displayed and chosen by touch screen 5 thus provides a programmed mode of operation while slider button 8 provides a manual form of control.

The setting of the motor drive in either embodiment enables the electric fishing system of the invention to have an automatic take-up function for adjusting the take-up force in real time. When the motor drive unit is transverse to the handle, the angler can hold the rod and reel with both hands for secure and comfortable fishing.

The electric fishing gear provided by the present invention also has extremely good water resistance. The handle and rod are interconnected so as to feel like an integrated design.

It is understood however that the description above is intended to describe preferred embodiments and is not intended to limit the scope of the appended claims.

All US patents and publications identified herein are hereby incorporated by reference.

The invention claimed is:

1. An electric fishing system that comprises:
   (a) a fishing rod connected to a handle, said handle having
       (i) a touch screen display disposed on an upper surface of said handle and (ii) a rechargeable battery in an interior space of said handle,
   (b) a fishing reel secured to said handle and holding an extended length of fishing line,
   (c) a motor, and
   (d) a motor speed control that is electrically connected to said touch screen display, wherein when an angler holding said handle touches said display and selects a displayed fishing technique routine, said motor speed control operates said motor to retrieve fishing line from said reel in accordance with the selected fishing technique.

2. The electric fishing system according to claim 1, wherein said motor speed control system comprises:
   a housing,
   a circuit board installed in the housing,
   a potentiometer mounted on the circuit board, and
   a spring-biased, speed-controlling slider button geared to said potentiometer whereby movement of said button adjusts a resistance value of said potentiometer which changes a current value in the motor and adjusts an operational retrieval speed of said fishing reel.

3. The electric fishing system of claim 2, wherein the housing includes:
   an opening with a slider slot that receives said slider button, and a cover body that is fixedly connected to the housing with a first connecting member.

4. The electric fishing system according to claim 3, wherein in the motor speed control system, the slider button engages a first speed-regulating tooth gear through a set of sliding tooth gears and a potentiometer tooth gear meshes with a second speed-regulating tooth gear, wherein when the sliding tooth gears drive the first speed-regulating tooth gear to rotate, the second speed tooth gear simultaneously drives the potentiometer tooth gear to adjust the resistance value of a resistor body within said potentiometer.

5. The electric fishing system according to claim 3, wherein the motor speed control further includes a compression spring that biases movement of said slider button, wherein one end of the compression spring is fixedly connected to the housing and in the slider groove, and the other end of said spring is connected to the slider.

6. The electric fishing system according to claim 1 wherein said motor speed control is substantially parallel to said handle.

7. The electric fishing system according to claim 6 wherein said motor is axially parallel with said handle.

8. The electric fishing system according to claim 6 wherein said motor is substantially perpendicular to said handle.

9. The electric fishing control system according to claim 8 wherein said motor interacts with a spindle shaft of said fishing reel with meshing pinion gears.

10. An integrated, electronic, smart fishing system that comprises:
    a fishing rod having an extended length along an axis and integrally connected to a handle that also has a lower arm section,
    a spinning or spincast fishing reel detachably secured to said lower arm section and to an underside of said handle, and
    a motor connected to the fishing reel and arranged perpendicular to the fishing reel and to the axis of said rod so as to provide a driving force for winding a fishing line on the fishing reel, and
    the handle being provided with a touch screen display and a battery that supplies power to the motor and said touch screen panel,
    a housing arranged around said motor, said housing being provided with a speed-adjusting button that is configured to adjust the rotation speed of said motor,
    wherein, when an angler can select a fishing mode for implementation by said motor by selecting a fishing style displayed on said touch screen with one hand while the other hand of the angler can grip said housing for said motor and adjust a rewind speed of said motor by pressing on a speed-adjusting button of said motor.

11. The fishing system according to claim 10, characterized in that:
    the fishing reel comprises a main outer shell, a spool unit, a transmission device and a braking device,
    the reel unit comprising a casing, a spool, and a spool fixing base,
    the transmission device comprising a spindle shaft and a toothed transmission sleeve disposed around the spindle shaft, the toothed transmission sleeve meshing with a speed-adjusting gear arranged at an axial end of the motor,
    the casing being fixedly secured to a distal end of the spindle shaft, the spool being pivotably connected around the spindle shaft via the spool fixing base,
    the braking device being disposed on the spindle shaft and close to the spool.

12. The fishing system according to claim 11, characterized in that:

the braking device comprises a brake feed gear, a brake double-linked gear, a brake adjustment knob, and a drag washer stack that are centered on the spindle shaft and sequentially outwardly arranged along its radial direction, the brake double-linked gear comprising a first brake transmission gear and a second brake transmission gear, external teeth of the first brake transmission gear being engaged with internal teeth of the brake adjustment knob, external teeth of the second brake transmission gear being engaged with external teeth of the brake feed gear, the brake feed gear being threadedly connected to an external thread of the spool fixing base such that the brake feed gear is axially movable relative to the spool fixing base, the drag washer stack being provided at a side of the brake feed gear, wherein when the brake adjustment knob is adjusted, the brake adjustment knob drives the brake feed gear forward or backward through the brake double-linked gear to thereby adjust the braking force, when the brake feed gear is driven forward, the brake feed gear presses the drag stack to squeeze the spool to restrict rotation of the spool to thereby increase the braking force, when the brake feed gear is retracted, the restriction of the drag stack on the spool is removed to reduce the braking force.

13. The fishing system according to claim 12, characterized in that:
the transmission device further comprises a first bearing, a second bearing, and an anti-reverse system,
one end of the toothed transmission sleeve being connected with a nut via a thread connection, and the other end being provided with a transmission gear,
wherein the first bearing, the anti-reverse gear, and the second bearing are sequentially sleeved on the toothed transmission sleeve between the nut and the transmission gear, and the anti-reverse system is configured to make the toothed transmission sleeve and the spindle shaft rotate unidirectionally.

14. The fishing system according to claim 13, characterized in that:
the transmission device further comprises a lever arm having a trigger disposed outside of the main outer shell and an internal end of the lever arm being disposed at an inside of the main outer shell,
wherein the transmission device is configured so that when the user operates the trigger by pulling that trigger towards the rod so that said internal end of the lever arm axially pushes the spindle shaft forward to achieve an axial movement.

15. The fishing system according to claim 14, characterized in that:
the spool unit further comprises a stop positioning member, a rewind pin, a limit ring, and an E-shaped retaining ring,
the stop positioning member comprising a spring member and a positioning member,
wherein: (a) the spring member and the positioning member are detachably connected with each other, (b) said rewind pin is fixedly arranged on the positioning member, (c) the positioning member is rotatably connected to the casing, (d) the limit ring and the E-shaped retaining ring are sleeved on one end of the spindle shaft near the casing, and (e) the limit ring cooperates with the E-shaped retaining ring to realize a telescopic movement of said rewind pin at a hole on one side of the casing, wherein:
when the spindle shaft is located at its original position, the limit ring pushes the positioning member to drive said rewind pin to extend outwardly, and
when the lever pushes the spindle shaft to move in the axial direction, the limit ring releases the restriction on the positioning member, and the positioning member restores due to the action of the spring which drives said rewind pin to retract into the casing.

16. The fishing system according to claim 11, characterized in that:
the housing comprises a lower housing and an upper housing whereby the lower housing and the upper housing are connected with each other via a first connecting member,
the lower housing comprises a hollow chamber, a mounting portion and a side opening,
wherein a speed regulating groove for accommodating the speed adjusting button is formed in a side of the mounting portion adjacent to a first side opening, and a double-linked tooth groove is formed at a second side of the hollow platform body adjacent to the speed regulating groove,
the upper housing is egg-shaped which is convenient for an angler to hold, a sealing groove is provided on a the side of the upper housing that contacts mounting portion, and a first sealing ring is disposed in a sealing groove.

17. The fishing system according to claim 16, characterized in that:
the speed-adjusting button is provided with a speed-adjusting tooth, and the speed-adjusting tooth is installed in the housing, and
the housing is further provided with:
a speed-adjusting double-linked gear comprising a shaft, a first speed-adjusting gear and a second speed-adjusting gear, one end of the shaft being fixed in the double-linked tooth groove, a second sealing ring being arranged between the first speed-adjusting gear and the second speed-adjusting gear, the first speed-adjusting gear being meshed with the speed-adjusting tooth;
a circuit board electrically connected to the motor and configured to control the operation of the motor, the circuit board being provided with a potentiometer which comprises a resistor and a potentiometer gear meshed with the second speed-adjusting gear,
wherein when the speed-adjusting gear drives the first speed-adjusting gear to rotate, the second speed-adjusting gear simultaneously drives the potentiometer gear to rotate to adjust the resistance of the resistor to thereby adjust the motor speed.

18. A method for automating a fishing process by steps that comprises:
selecting on a menu of a touch screen panel of smart fishing reel assembly a displayed jigging routine that mimics a fishing style, wherein said smart fishing assembly comprises:
a fishing rod having an extended length along an axis and integrally connected to a handle that also has a lower arm section,
a spinning or spincast fishing reel detachably secured to said lower arm section and to an underside of an upper arm section, and a motor drive connected to the fishing reel and arranged on one side of the fishing reel and perpendicular to said rod to provide a driving force for winding a fishing line on the fishing reel, and the handle being provided with a touch screen panel and a battery that supplies power to said motor drive and said touch screen panel, a housing arranged around a motor in said motor drive, the housing being provided with a speed-adjusting button that is configured to adjust the rotation speed of the motor drive, wherein, in use, one hand of the user grips the handle and controls the touch screen to select the fishing mode, and the other hand of the user grips the housing to adjust the speed of the motor by pressing on the speed-adjusting button.

\* \* \* \* \*